Figure 1:
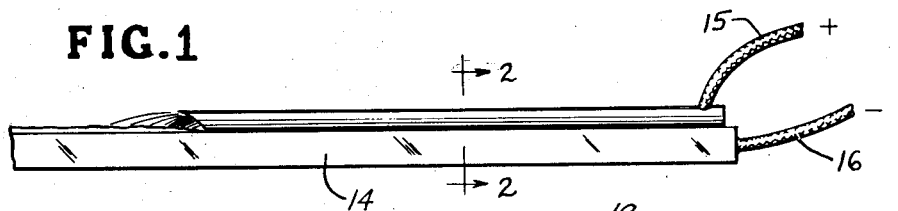

April 10, 1934.  R. R. APPLEGATE  1,953,942
WELDING ELECTRODE
Filed May 2, 1932

Inventor
Robert R. Applegate
By Bates Goldrick & Teare
Attorneys

Patented Apr. 10, 1934

1,953,942

UNITED STATES PATENT OFFICE 1,953,942

WELDING ELECTRODE

Robert R. Applegate, Shaker Heights, Ohio, assignor to Thomas P. Champion, Shaker Heights, Ohio Application May 2, 1932, Serial No. 608,601

6 Claims. (Cl. 219—8)

This invention relates to a method of arc welding, and to an electrode therefor. The electrode is particularly adapted for use in connection with a method of arc welding, which utilizes a self consuming electrode such as is illustrated, described and claimed in an application for Letters Patent of the United States, which bears Serial No. 597,536 and was filed March 8th, 1932, by Messrs. Thomas P. Champion, Robert E. Kinkead and Robert R. Applegate.

Briefly the method set forth in such application comprises providing a combustible and insulating coating upon an electrode, laying the electrode along the line of weld, and then applying current progressively to the electrode, whereby the electrode is automatically consumed during the welding operation. I have found that when the coating was approximately of uniform thickness throughout the entire length of the rod, an excessive amount of splatter resulted, and the resulting weld was generally rough in appearance, wherefore the surface was unsuited for obtaining a satisfactory weld by superimposing a second layer thereon. The splattering referred to is the tendency of the electrodes to throw small globules of metal on each side of the weld, which must be removed at the end of the welding operation. Furthermore, the splattering tends to make the arc unstable and necessitates the use of higher voltage in order to keep it from blowing out.

The principal object of the present invention therefore, is to provide a method and an electrode by means of which the objections hereinbefore mentioned may be entirely eliminated, and whereby a weld that is smooth and clean in appearance may be readily obtained. In this connection, my invention also contemplates the provision of an electrode which operates during the welding process to maintain the welded metal in a molten condition for a sufficient length of time to permit all of the occluded gases therein to rise to the surface, whereby a more perfect weld is obtained.

I carry out my invention by providing a coating, which forms a hood over the arc during the welding operation and thereby directs the arc in a predetermined path along the weld. This hood functions to keep the metal from splattering, to keep the arc even, and to direct the flame along the weld for an appreciable distance, so as to keep the metal heated for a sufficient length of time to permit the occluded gases to rise to the surface. I have found that this result can be accomplished by providing a coating, which has a different burning rate along different portions of the rod. Such, for example, as a fast burning rate along that portion which is in close proximity to the work and a slow burning rate along the remaining portion or at least along the portion which is close to the work, wherefore the coating forms a hood or projecting mantle over the arc and thereby causes the crater to be formed on an oblique angle with reference to the axis of the electrode. As a result, the flame is directed for a substantial distance along the welded material. This anneals the weld and causes the metal to flow evenly and smoothly from the electrode.

Figure 2:
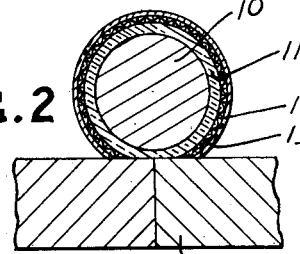
Figure 5:
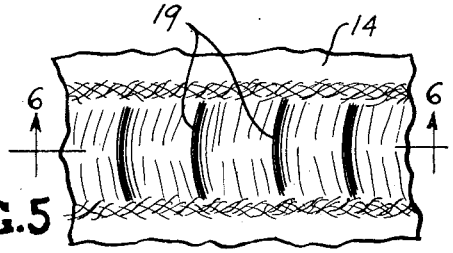
Figure 3:
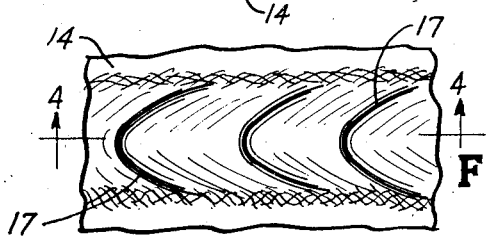
Figure 6:
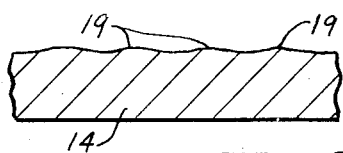
Figure 4:
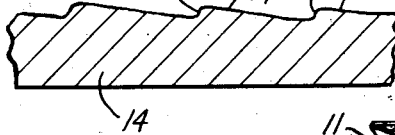
Figure 7:
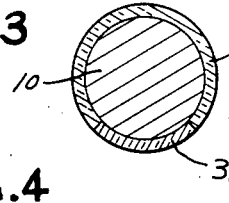
Figure 9:
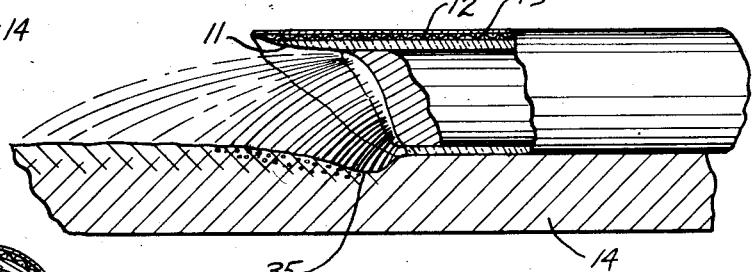
Figure 8:
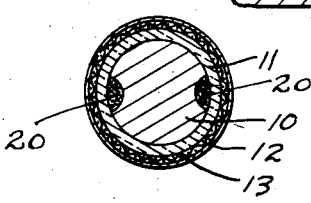

Referring to the drawing, Fig. 1 is a side elevation of an article being welded in accordance with my invention; Fig. 2 is a section on an enlarged scale taken on the line 2—2 in Fig. 1; Fig. 3 is a top plan view of a welded strip that is made with a form of electrode hereinbefore referred to as part of the prior art; Fig. 4 is a section taken on the line 4—4 in Fig. 3; Fig. 5 is a top plan view of a weld made in accordance with the present method; Fig. 6 is a section taken on the line 6—6 in Fig. 5; Fig. 7 is a transverse section through a modified form of electrode; Fig. 8 is a section through a still further modified form of electrode; Fig. 9 is a diagrammatic view on an enlarged scale showing the relationship of the electrode to the work during the welding operation.

My invention is shown in the form of a rod 10, which is provided with a coating of insulating and combustible material. The coating may comprise an inner layer 11, an outer layer 12, and an intermediate layer 13.

My invention is concerned with the method of coating preparation, by means of which one part of the coating is caused to burn at a faster rate than another portion thereof. Thus, when the electrode is placed upon the work 14 and connected to an electric circuit through the leads 15 and 16 and short circuited, such as by touching the end of the electrode and the work with a carbon pencil so as to start the arc, a hood is formed by the coating over the arc, as is shown in Figs. 1 and 9.

With the type of coating just described, the difference in burning rates may be accomplished by removing a longitudinal strip of the coating along the portion which is adapted to be in close proximity to the work. Where the electrode is laid upon the work, as is shown in Fig. 1, a strip may be removed along the bottom of the electrode so that the coating is thinner along the bottom than it is along the remaining portion of the rod. This difference in thickness will cause a difference in burning rate, and thereby cause the formation of the hood, as is shown in Fig. 9, and also the formation of the rod crater obliquely to the axis of the rod. The hood not only serves to concentrate the flame along the weld and thereby to substantially eliminate splatter, but also to maintain the arc more stable, and cause it to advance at a faster and more uniform rate. In addition, the hood causes the flame to extend an appreciable distance along the weld and thereby to maintain the metal in moulten condition for a sufficient length of time to permit all occluded gas to arise to the surface before cooling sets in. Thus, a more perfect and cleaner weld is obtained.

A further observable characteristic in connection with a weld that is made with an electrode embodying my invention is the fact that the weld more nearly approximates a flat surface throughout the length thereof, thus making it readily adapted for the application of succeeding layers in cases, where such procedure is desired. For example, in Figs. 3 and 4, I have shown a weld, which is made by a rod having a covering of substantially equal burning rates throughout the entire portion thereof, in which case, the metal is shown as being disposed in long grain like lines 17 and ridges 18 upon the work. In Figs. 5 and 6, I have shown diagrammatical views illustrating the appearance of a weld which is made with an electrode embodying the present invention, and in such illustrations it will be observed that the lines 19 are slightly curved lines and that the ridges are gentle undulating lines rather than sharp depressions, as is the case in the preceding illustration. Obviously, the presence of angular depressions tend to assist the formation of gas pockets whenever a succeeding layer is laid down on the weld.

A further consideration in connection with the use of an electrode covering which burns at variable rates is the fact that the thickness of the coating should be such as to maintain a synchronous burning rate of the rod and covering. For example, if the material should burn away too rapidly, the arc is advanced too fast along the underside of the rod, thus causing poor penetration or fusion, which results in short circuiting of the rod. If it burns too slowly, the arc path to the work is too long, and higher voltage is required to maintain the operativeness of the arc. Where the arc tends to blow out, there is a strong tendency to throw pellets and to force the metal away from the crater, thus obtaining the characteristic grain-like formation illustrated in Fig. 3. When, however, the thickness and character of the coating is balanced so as to synchronize the burning rate with the melting rate, the metal flows evenly and smoothly and provides a satisfactory fusion and a uniform weld.

In addition, the formation of the crater at an oblique angle creates a desirable condition for directing the downwardly acting arc with the accompanying direction of the flame out and along the line of the weld. This not only reduces the voltage necessary to obtain satisfactory operation, but anneals the solidified metal at a point several inches away from the crater.

I have found that the advantages flowing from the use of the invention may be obtained on relatively large rods, as for example, one inch in diameter and larger by providing longitudinally extending grooves 20 on opposite sides of the rod and imbedding in the grooves a cotton strip that is impregnated with the insulating material that is used for the inner and outer layers hereinbefore described. The use of these imbedded strips in conjunction with the layers of coating hereinbefore set forth, assists materially in the control of the burning rate, so as to obtain the desired protection and shape of crater formation on the large electrodes.

A further modification of my invention is shown in Fig. 7 wherein the coating may have a uniform thickness along the surface of the electrode, but wherein the difference in the rate of combustion may be obtained by utilizing a refractory material having a definite burning rate for that portion 31 that is disposed adjacent the work, and a material of different burning rate for that which forms the remaining part 30 of the coating. In such case, the material 31 will have a faster burning rate than the material 30.

For the purpose of carrying out my invention, I have found that with a rod having a diameter of one-fourth inch, satisfactory results may be obtained if the combined thickness of the inner, outer and intermediate layers is approximately .075 inches thick. This may be divided between the layers as follows:—.045 inches for the inner layer, .020 inches for the impregnated cotton sleeve which forms the intermediate layer, and .010 inches for the outer layer. After the layers are applied and dried, a flat strip may be ground along the rod until the remaining part of the covering at the thinnest section approximates .030 inch. When an electrode is so made and is laid upon the work and a welding current of approximately 300 to 325 amperes is impressed at a pressure of thirty-five to forty volts, it will be found that the coating on the under side will burn faster than that on the upper side, and that this will result in the formation of a projecting mantle or hood, as is shown particularly in Fig. 9. The projected arc flame will be about three inches in length and will act to keep the metal in moulten condition approximately ½ inch from the crater 35. This will allow ample time for occluded gases to rise to the surface and thereby product a weld that is free from objectionable gas pockets. In addition, it causes the metal to wash back away from the crater in substantially uniform manner, thus providing a relatively smooth flat surface on the weld.

The ingredients for making the inner and outer layers 11 and 13 respectively which I have found to be satisfactory comprise the following percentages by weight:—

| | Per cent |
|---|---|
| Silica | 28 |
| Iron oxide | 14 |
| Ferromanganese | 18 |
| Kaolin | 12 |
| Calcium fluoride | 10 |
| Sodium fluoride | 4 |
| Chalk | 6 |
| Manganese dioxide | 8 |
| | 100 |

The ingredients are all mixed together in a finely powdered state and sufficient water is added until the mixture attains the consistency of paste, which may be applied to the electrode by means of an extruding machine. The cotton sleeve 12 may then be fitted over the electrode and the covered rod dipped into the paste to apply the final coating. The same ingredients may be used for the inner and outer layers of the coating for the electrode of Fig. 8 and also for the fast burning portion 31 of the covering of Fig. 7.

A slower burning coating which I have found to be satisfactory for the part 30 of Fig. 7 may be made of the following ingredients and in percentages designated by weight:—

| | Per cent |
|---|---|
| Aluminum silicate | 10 |
| Aluminum oxide | 18 |
| Carborundum | 6 |
| Calcium carbonate | 20 |
| Asbestos | 10 |
| Zerconium oxide | 12 |
| Kaolin | 16 |
| Sodium silicate | 8 |
| | 100 |

Where part of the cover is relatively slow burning and part is relatively fast burning, as is shown in Fig. 7 the coating may be uniform in thickness around the electrode and for a ¼ inch rod may approximate .030 inch in thickness.

From the foregoing description it will be apparent that an electrode prepared in the manner indicated has marked advantages in the character of weld that is obtained, and in the speed at which it is performed. In addition, the surface of the weld being flat and smooth is well adapted for receiving additional layers of welded metal, and for effecting a homogenous union therewith.

I claim:—

1. A welding electrode that is operated when laid upon the work to be welded, and having a coating of insulating and combustible material, the coating having a different burning rate throughout the entire length thereof and along a relatively small work engaging portion thereof than around the remaining portion, whereby when the rod is laid upon the work and used, the coating forms a canopy over the arc and directs the flame along the weld.

2. A welding electrode that is operated when laid on the work to be welded, and having a coating of insulating and combustible material, the coating having a variable thickness whereby one part thereof in contact with the work burns at a different rate from another part, and forms a hood over the arc.

3. A welding electrode that is operated when laid upon the work to be welded, and having an insulating coating of combustible material, the part of the coating in contact with the work being adapted to burn at a faster rate than the remaining part, whereby the coating forms a hood over the arc during the welding operation.

4. A welding electrode that is operated when laid upon the work and having a coating of combustible insulating material, the coating having the portion along the work engaging side thereof thinner and faster burning than along the opposite side thereof.

5. A welding electrode adapted to be operated when laid upon the work to be welded and having a relatively thin layer of insulating combustible material along the work engaging portion thereof, and having a relatively thick layer of insulating combustible material along the remaining portion thereof.

6. A welding electrode adapted to be operated when laid upon the work to be welded and having a relatively fast burning layer of combustible insulating material along the work engaging portion thereof and having a relatively slow burning insulating combustible material along the remaining portion thereof.

ROBERT R. APPLEGATE.